US008238010B2

(12) United States Patent
Turner

(10) Patent No.: US 8,238,010 B2
(45) Date of Patent: Aug. 7, 2012

(54) MEMS DEVICE FOR PRODUCING A LEMNISCATE PATTERN TO COUNTER ZIGZAG EFFECT

(75) Inventor: Arthur Monroe Turner, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1069 days.

(21) Appl. No.: 12/098,209

(22) Filed: Apr. 4, 2008

(65) Prior Publication Data
US 2008/0252714 A1 Oct. 16, 2008

Related U.S. Application Data

(60) Provisional application No. 60/910,857, filed on Apr. 10, 2007.

(51) Int. Cl.
G02B 26/08 (2006.01)
G02B 26/10 (2006.01)
G02B 26/12 (2006.01)
B41J 15/14 (2006.01)
B41J 27/00 (2006.01)

(52) U.S. Cl. .................. 359/199.1; 359/226.2; 347/243; 347/259; 347/260

(58) Field of Classification Search ............... 359/199.1, 359/226.2; 347/243, 259, 260
See application file for complete search history.

(56) References Cited

U.S. PATENT DOCUMENTS

| 6,900,918 | B2* | 5/2005 | Orcutt et al. | 359/224.1 |
|---|---|---|---|---|
| 6,956,684 | B2* | 10/2005 | Orcutt | 359/199.1 |
| 7,009,748 | B2* | 3/2006 | Turner et al. | 359/224.1 |
| 7,173,747 | B2* | 2/2007 | Yasuda et al. | 359/224.1 |
| 7,277,214 | B2* | 10/2007 | Yasuda et al. | 359/226.2 |
| 7,362,488 | B2* | 4/2008 | Yasuda et al. | 359/224.1 |
| 2004/0004775 | A1* | 1/2004 | Turner et al. | 359/877 |
| 2004/0027449 | A1 | 2/2004 | Turner et al. | |
| 2004/0130766 | A1 | 7/2004 | Dewa et al. | |
| 2005/0078345 | A1 | 4/2005 | Turner et al. | |
| 2006/0001940 | A1* | 1/2006 | Turner et al. | 359/224 |

OTHER PUBLICATIONS

PCT Notification of Transmittal of the International Search Report and The Written Opinion of the International Searching Authority, or The Declaration, dated Jul. 30, 2008, from the International Searching Authority.

* cited by examiner

*Primary Examiner* — Uyen Chau N Le
*Assistant Examiner* — John M Bedtelyon
(74) *Attorney, Agent, or Firm* — Warren L. Franz; Wade J. Brady, III; Frederick J. Telecky, Jr.

(57) ABSTRACT

A MEMS device, a printer and a method of printing is presented including providing a light source producing a modulated beam of light, positioning a mirror with a reflective surface to intercept the modulated beam of light. Allowing the mirror to rotate on a single-axis hinge structure such that the resultant reflected beam is swept in a scan plane and creating an image at an intersection of the scan plane and an image plane. Causing the mirror to rotate about the single-axis hinge structure and to oscillate at a tilt about the single-axis hinge structure, wherein the resultant reflected beam of light forms a lemniscate pattern along the image plane, and wherein the lemniscate pattern has an inner angle between a left sweep segment and a right sweep segment of the image. Synchronizing the inner angle of the lemniscate pattern formed on the image plane to a motion of a photosensitive medium such that an image is formed on the photosensitive medium along lines substantially parallel to each other and orthogonal to the movement of the photosensitive medium.

9 Claims, 11 Drawing Sheets

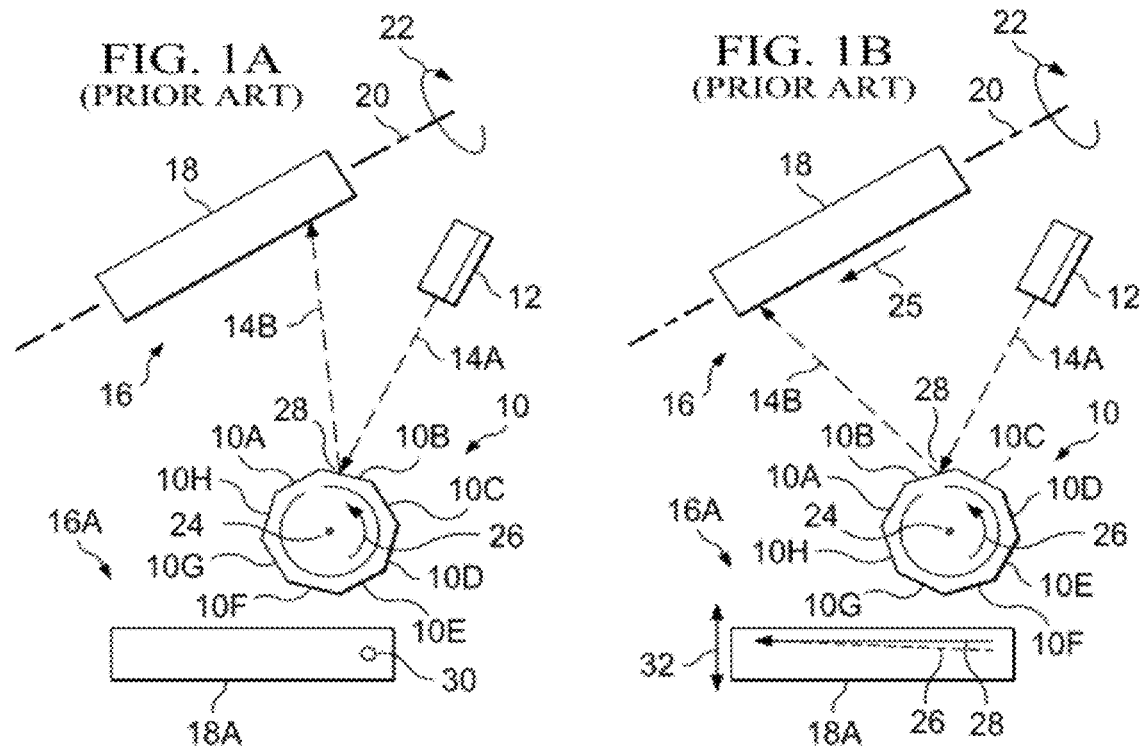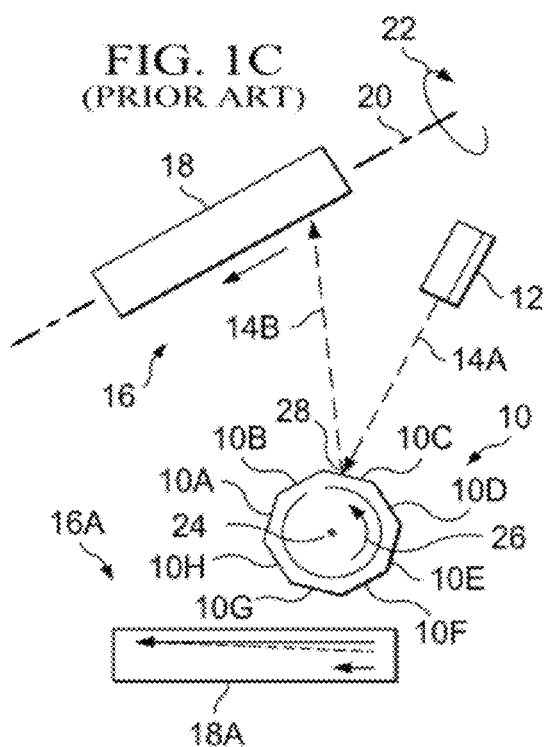

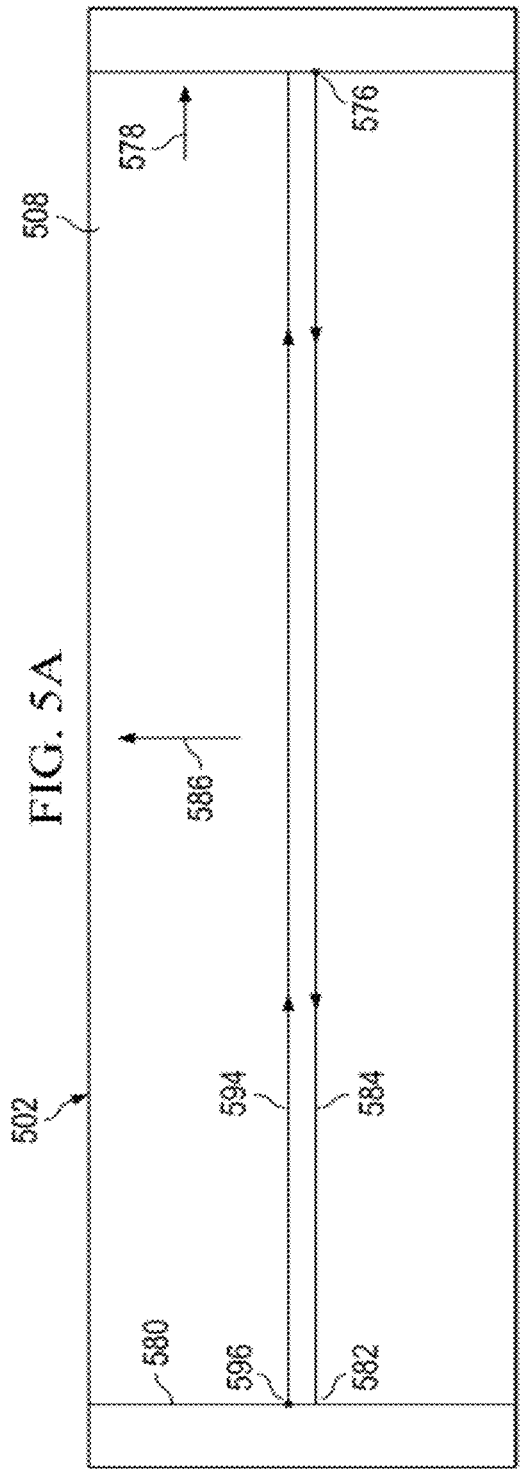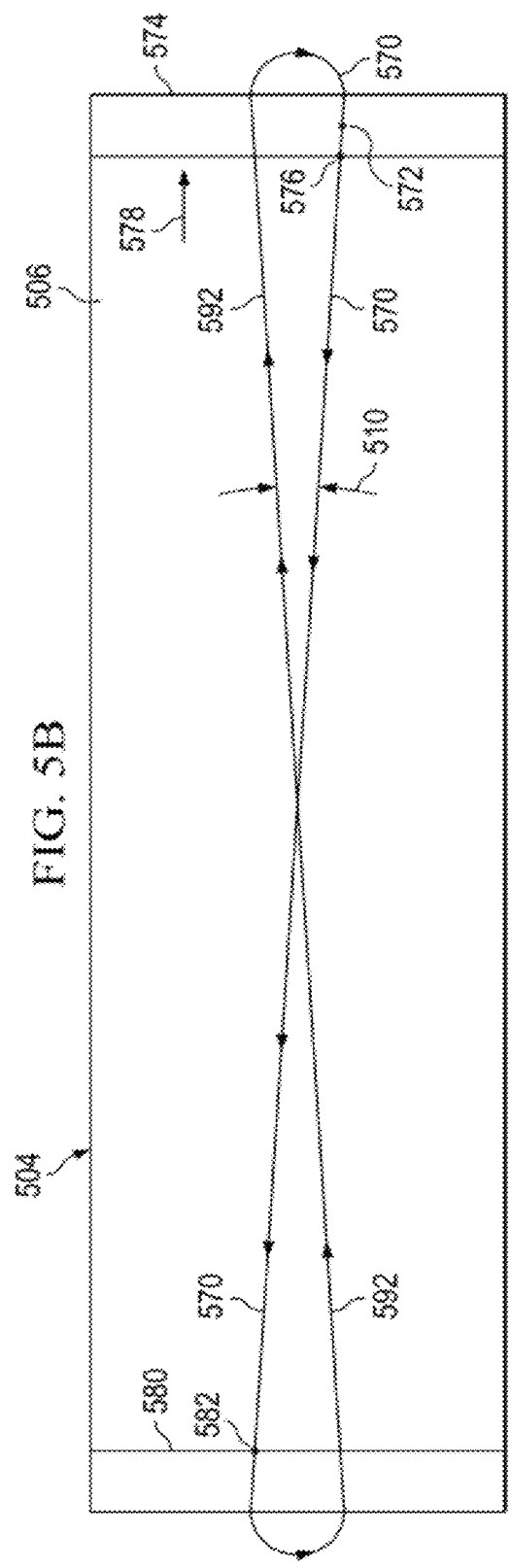

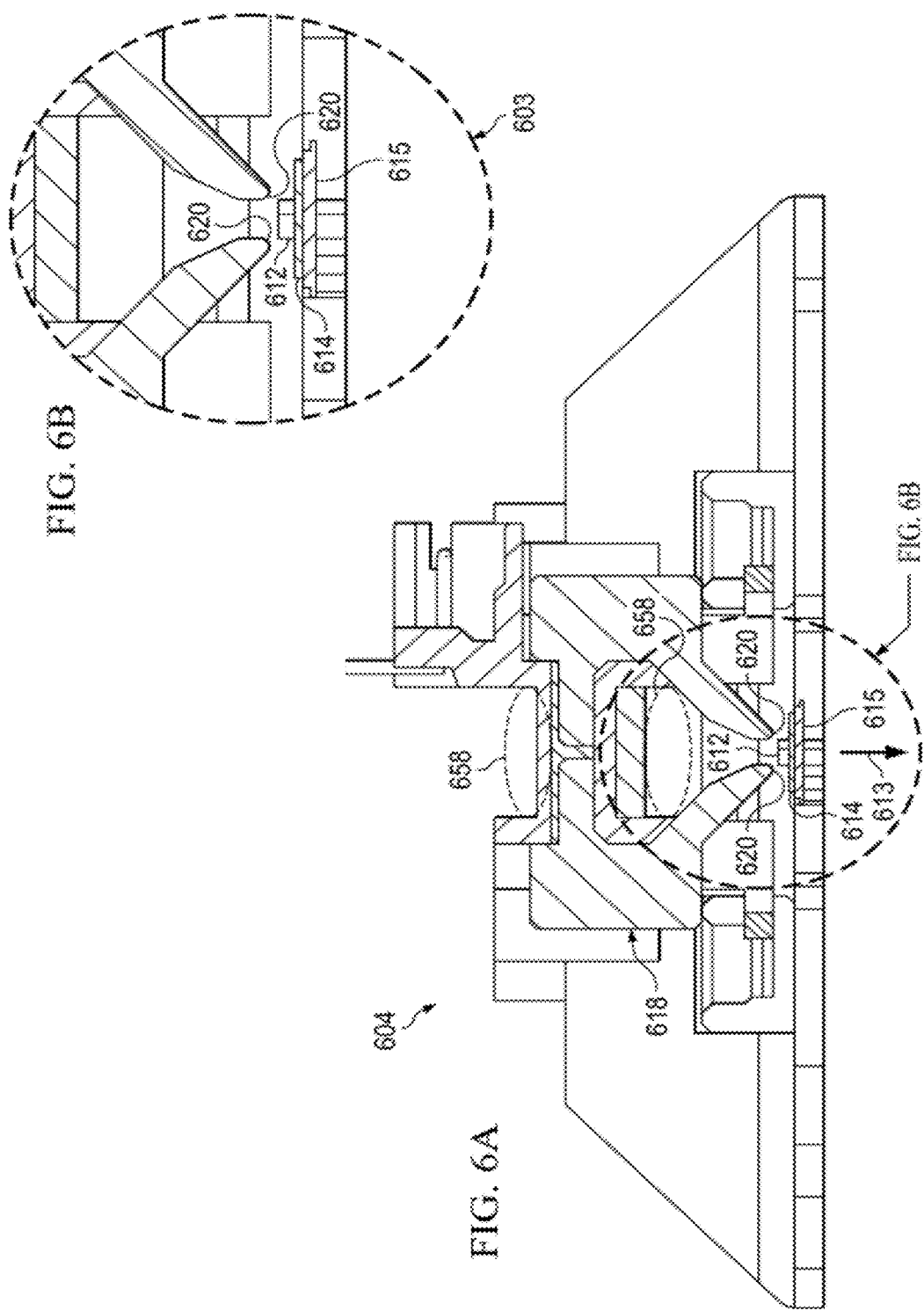

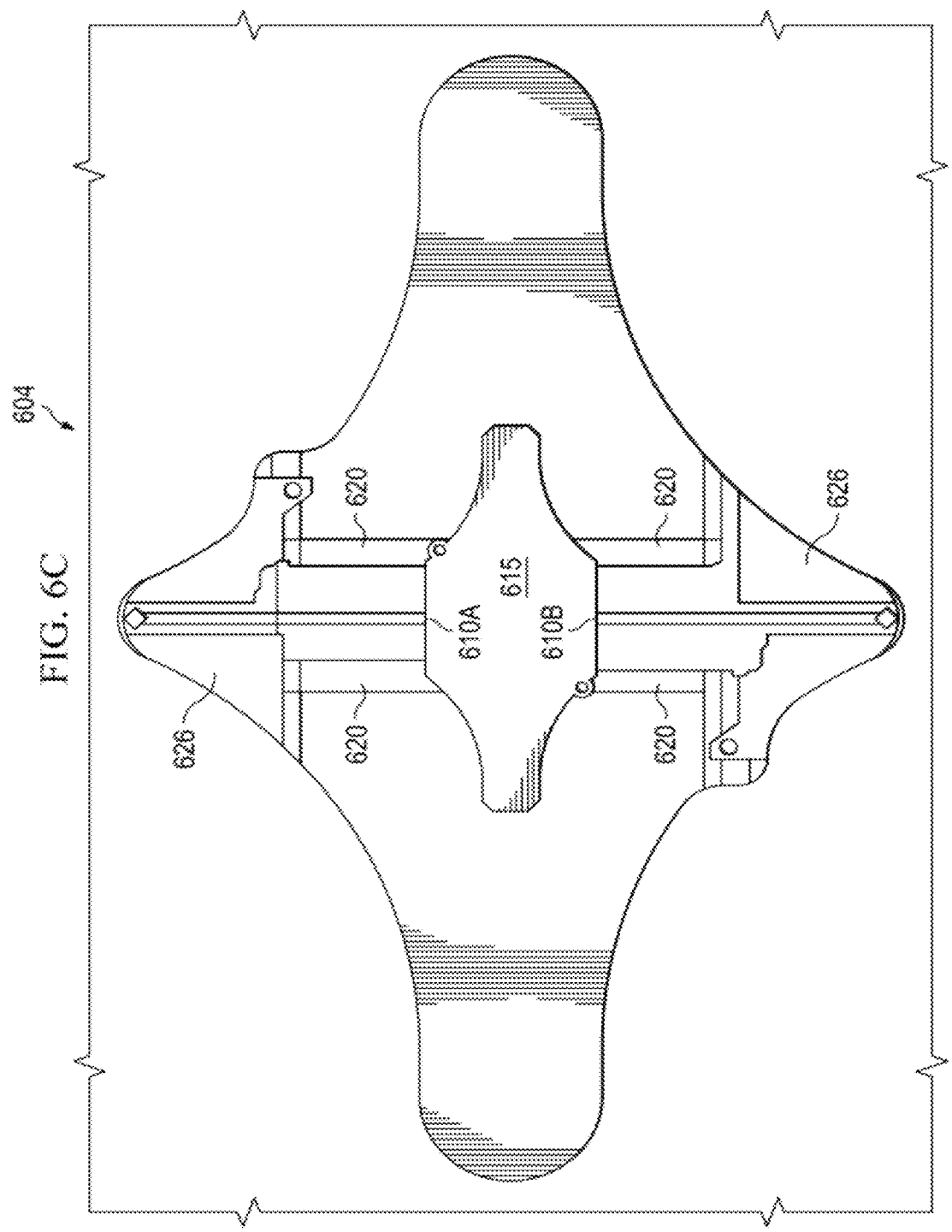

MEMS DEVICE FOR PRODUCING A LEMNISCATE PATTERN TO COUNTER ZIGZAG EFFECT

This application claims the benefit of U.S. Provisional Application Ser. No. 60/910,857 filed on Apr. 10, 2007, entitled "Bi-directional Laser Printing Using a MEMS Galvo Mirror," which application is hereby incorporated herein by reference.

TECHNICAL FIELD

The present invention relates generally to laser printers and more specifically to the use of single-axis MEMS (micro-electric mechanical systems) type mirror to provide an oscillating tilt and raster type scanning of a modulated light, thereby producing parallel lines on a moving photosensitive medium.

BACKGROUND

Many laser printers employ a continuously moving printing drum because a large amount of data is output to the printing device in a rapid, continuous process. The printer cannot stop the drum mechanism precisely enough to wait until more data arrives, without creating a visible gap or misalignment of the dots on the printed page.

Rotating polygon scanning mirrors are used in one method of laser printing to provide a raster scan of the image of a laser light source across a moving photosensitive medium, such as a rotating drum. Such a system requires that the rotation of the photosensitive drum and the rotating polygon mirror be synchronized so that the beam of light (laser beam) sweeps or scans across the rotating drum in one direction as a facet of the polygon mirror rotates past the laser beam. The next facet of the rotating polygon mirror generates a similar scan or sweep, which also traverses the rotating photosensitive drum but provides an image line that is spaced or displaced from the previous image line. Since the movement of the rotating drum is substantially constant and does not stop as each sweep or scan line traverses from one side to the other, it will be appreciated that the sweep or scan can not be exactly at a right angle with the rotating drum or the lines of print would be at a slight angle on the finished printed page. Instead, the rotating polygon mirror is mounted at a slight angle so that the scanning light beam sweeps or scans at a slight angle with respect to the movement of the rotating drum. However, since the speed of the rotating polygon mirror and the rotating photosensitive medium or drum are synchronized, and since the slight angular movement of the sweep or scan advances the location of the beam image the same distance and in the same direction as the movement of the rotating photosensitive medium or drum, the resulting lines of print are parallel and substantially at right angles or orthogonal to the printed page.

This arrangement will maintain parallel printed line images so long as the relative geometries of the rotating polygon mirror and photosensitive drum remain constant from scan to scan. Typical polygon scanning mirror laser printers do not include any means or devices for dynamic alignment of the rotating mirror and the photosensitive drum. It is further appreciated by those skilled in the laser printing art, that the rotating mirror is a very precise part or component of the laser printer, which must spin at terrific speeds and without undue wear of the bearings if its print quality is to be maintained.

A prior art single flat mirror configuration that prints in one direction only may be less complex and lighter than a polygon scanning mirror, however the single flat mirror, single direction configuration is inefficient as there is no printing during the mirrors return scan. This method may require about two times the on and off switching speed of the laser compared to a polygon based laser printer because of the low duty cycle of the scan engine. Further a prior art single flat mirror operated in both directions may cause a small decrease in print quality due to the zigzag effect. The zigzag effect pertains to a print difference between the edges of a page and the center of a page.

Another prior art method is a two-axis analog mirror MEMS device, which may or may not be fabricated out of a single piece of material (such as silicon, for example). A two-axis analog mirror MEMS device is smaller and lighter than a polygon mirror configuration. A two-axis mirror MEMS device may be used to minimize or eliminate the zigzag effect of a prior art single axis MEMS device. The layout of a two-axis analog mirror MEMS device may consist of a mirror supported on a gimbal frame by two silicon torsional hinges. The gimbal frame is attached to a support frame by another set of torsional hinges. One example, of a dual axis torsional hinged mirror is disclosed in U.S. Pat. No. 6,295,154 entitled "Optical Switching Apparatus" and was assigned to the same assignee on the present invention. While the two-axis mirror MEMS device may be effective in minimizing or eliminating the zigzag effect, the two-axis mirror may be expensive to manufacture.

SUMMARY OF THE INVENTION

These and other problems are generally solved or circumvented, and technical advantages are generally achieved by the use of MEMS (micro-electric mechanical systems) type single-axis mirrors to provide raster type scanning across a moving photosensitive medium in parallel lines by precisely controlling an oscillating tilt in the single-axis mirror, which causes the MEMS device to produce a lemniscate patterned scan.

In accordance with an illustrative embodiment of the present invention, a printer is presented comprising a light source providing a modulated beam of light, a first device, and a second device. The first device includes a mirror with a reflective surface positioned to intercept the modulated beam of light. A mirror rotates on hinges of a single-axis hinge structure such that the resultant reflected beam is swept in a scan plane creating an image at an intersection of the scan plane and an image plane. A first driver system causes the mirror structure to rotate about the single-axis hinge structure and to oscillate at a tilt about the single-axis hinge structure, wherein the resultant reflected beam of light forms a lemniscate pattern along the image plane. The lemniscate pattern has an inner angle between a left sweep segment and a right sweep segment of the image.

The second device includes a photosensitive medium with a first dimension substantially along the intersection of the scan plane and image plane, the photosensitive medium located to receive the image of the reflected beam of light as the reflected beam of light is swept along the intersection. A second device driver causes the photosensitive medium to move in a second dimension substantially orthogonal to the first dimension. The inner angle of the lemniscate pattern formed on the image plane is synchronized to the motion of the photosensitive medium such that the image formed on the moving photosensitive medium lies along lines substantially parallel to each other and orthogonal to the movement of the photosensitive medium.

Advantages of preferred embodiments of the present invention include presenting a MEMS device for providing a lower cost, efficient printer device, which corrects for the zigzag effect.

The foregoing has outlined rather broadly the features and technical advantages of an illustrative embodiment in order that the detailed description of the invention that follows may be better understood. Additional features and advantages of an illustrative embodiment will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the illustrative embodiments as set forth in the appended claims.

BRIEF DESCRIPTION OF THE DRAWINGS

For a more complete understanding of the illustrative embodiments, and the advantages thereof, reference is now made to the following descriptions taken in conjunction with the accompanying drawings, in which:

FIGS. 1A-1C illustrate the use of a rotating polygon mirror for generating the sweep of a laser printer according to the prior art;

FIGS. 5A and 5B show a schematic of the laser beam trajectory responsive to mirror movement about the axis during one complete cycle in accordance with the illustrative embodiments;

FIGS. 6A-6C show views of a bi-directional single-axis hinge structure;

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 2A:
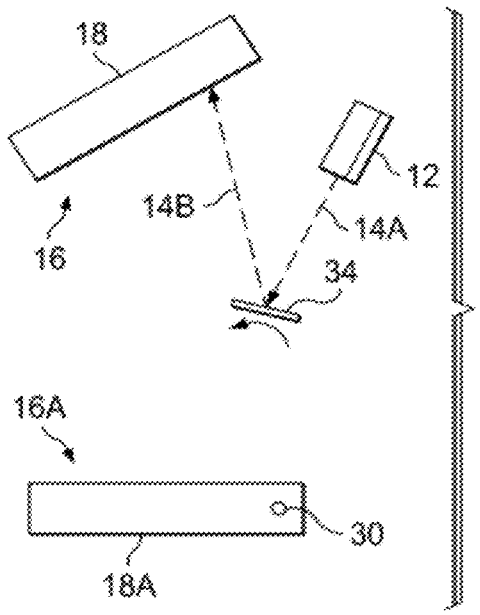
FIGS. 2A-2D illustrate a prior art example of using an uncorrected single axis flat resonant mirror to generate a beam sweep of on a laser printer.

The making and using of the presently preferred embodiments are discussed in detail below. It should be appreciated, however, that an illustrative embodiment provides many applicable inventive concepts that can be embodied in a wide variety of specific contexts. The specific embodiments discussed are merely illustrative of specific ways to make and use the invention, and do not limit the scope of the invention.

The present invention will be described with respect to illustrative embodiments in a specific context, namely a laser printer. The invention may also be applied, however, to other MEMS device systems.

Referring now to FIGS. 1A, 1B and 1C, there is shown an illustration of the operation of a prior art laser printer using a rotating polygon mirror. As shown in FIG. 1A, there is a rotating polygon mirror 10, which in the illustration has eight reflective surfaces 10A-10H. A light source 12 produces a beam of light, such as a laser beam, that is focused on the rotating polygon mirror so that the beam of light from the light source 12 is intercepted by the facets 10A-10H of rotating polygon mirror 10. Thus, the laser beam of light 14A from the light source 12 is reflected from the facets 10A-10H of the polygon mirror 10 as illustrated by dashed line 14B to a moving photosensitive medium 16 such as a rotating photosensitive drum 18 having an axis of rotation 20. The moving photosensitive medium 16 or drum 18 rotates around axis 20 in a direction as indicated by the arcuate arrow 22 such that the area of the moving photosensitive medium 16 or drum 18 exposed to the light beam 14B is continuously changing. As shown in FIG. 1A, the polygon mirror 10 is also rotating about an axis 24 (axis is perpendicular to the drawing in this view) as indicated by the second arcuate arrow 26. Thus, it can be seen that the leading edge 28 of facet 10B of rotating polygon mirror 10 will be the first part of facet 10B to intercept the laser beam of light 14A from the light source 12. As the mirror 10 rotates, each of the eight facets of mirror 10 will intercept the light beam 14A in turn. As will be appreciated by those skilled in the art, the optics to focus the light beam, the lens system to flatten the focal plane to the photosensitive drum, and any fold mirrors to change the direction of the scanned beam are omitted for ease of understanding.

Illustrated below the rotating polygon mirror 10 is a second view 16A, 18A of the photosensitive medium 16 or drum 18 as seen from the polygon scanner. As shown by reference number 30 on the photosensitive drum view 18A, there is the beginning point of an image of the laser beam 14B on medium 16A immediately after the facet 10B intercepts the light beam 14A and reflects it to the moving photosensitive medium 16 or drum 18.

Referring now to FIG. 1B, there is shown substantially the same arrangement as illustrated in FIG. 1A except the rotating polygon mirror 10 has continued its rotation about axis 24 such that the facet 10B has rotated so that its interception of the laser beam 10A is about to end. Because of the varying angle the mirror facets present to the intercepted light beam 14A, the reflected light beam 14B will intersect the surface of the rotating drum as shown at 25 in FIG. 1B.

Note that since rotating drum 18 is moving orthogonally with respect to the scanning movement of the light beam 14B, that if the axis of rotation 24 of the rotating mirror was exactly orthogonal to the axis 20 of the rotating photosensitive drum 18, an image of the sweeping or scanning light beam on the photosensitive drum would be recorded at a slight angle.

As shown more clearly by view 18A of the photosensitive drum, the dashed line (image plane line 26) illustrates an image of the scanning light beam, as it would appear on a stationary image plane located at the intersection of a scan plane 14B and the photosensitive drum 18. The scan plane is the plane in which the light beam travels. The image plane line 26 shows the trajectory of the light beam 14B is itself at a slight angle, whereas the solid line 28 representing the resulting image on the photosensitive drum is not angled but orthogonal to the rotation or movement of the photosensitive medium.

To print printed line image 28 orthogonally with respect to the axis of the rotating photosensitive drum 18, the rotating axis 24 of the polygon mirror 10 is typically mounted at a slight tilt with respect to the rotating photosensitive drum 18 so that the amount of vertical travel or distance traveled by the light beam along vertical axis 32 during a sweep or scan across medium 16 is equal to the amount of movement or rotation of the photosensitive medium 16 or drum 18.

FIG. 1C illustrates that facet 10B of rotating polygon mirror 10 has rotated away from the light beam 14A, and facet 10C has just intercepted the light beam. Thus, the process is repeated for a second image line. Continuous rotation will of course result in each facet of rotating mirror 10 intercepting light beam 14 producing a series of parallel and spaced image lines which when viewed together will form a line of print or other image. The rotating polygon mirror found in this prior art example may be large, heavy, and difficult to realign.

Turning to FIGS. 2A-2D, an uncorrected prior art single axis mirror is illustrated. The prior art single axis mirror may be sufficient for many types of printing. The small printing aberrations caused by the angle of print being, for the most part, unnoticeable by the human eye. However, for the highest quality printing of especially fine detail, a correction of the zigzag effect is desired.

It is instructive herein to examine the single axis prior art effort with an uncorrected zigzag effect. Referring now to FIGS. 2A, 2B, 2C and 2D, there is illustrated a prior art example of a laser printer using a single axis rotating mirror to generate the beam sweep. As shown in FIGS. 2A, 2B, 2C and 2D, the arrangement is substantially the same as shown in FIGS. 1A, 1B and 1C except that the rotating polygon mirror has been replaced with a single rotating (pivoting) flat mirror 34. From the polygon mirror example above, it can be seen that angling a mirror may produce a more orthogonal line. If the scanning mirror generating the beam sweep or scan can be mounted at a slight angle in the same manner as a rotating polygon mirror, and the rotating photosensitive drum and the scanning mirror can be synchronized as the single flat mirror first pivots or rotates in one direction such that a first printed image line on the medium is at right angles or orthogonal with the movement of the photosensitive medium.

Figure 2B:
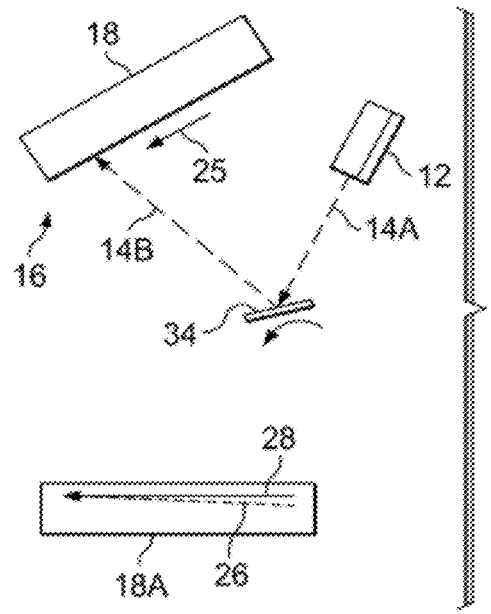

As was the case with respect to FIG. 1A, FIG. 2A illustrates the beginning of a beam sweep by the single axis mirror 34. Likewise, FIG. 2B illustrates the beam sweep as mirror 34 substantially completes its scan, and as illustrated at the photosensitive drum view 18A, the mirror 34 is mounted at an angle such that the beam sweep is synchronized with the movement of the rotating drum 18. Like the case in FIG. 1B, the image formed on the image plane as illustrated by reference number 26 results in an angled image line 26. Unlike the case in FIG. 1B, the image 28 on the moving photosensitive medium 16 or drum 18B may also be slightly angled.

Figure 2C:
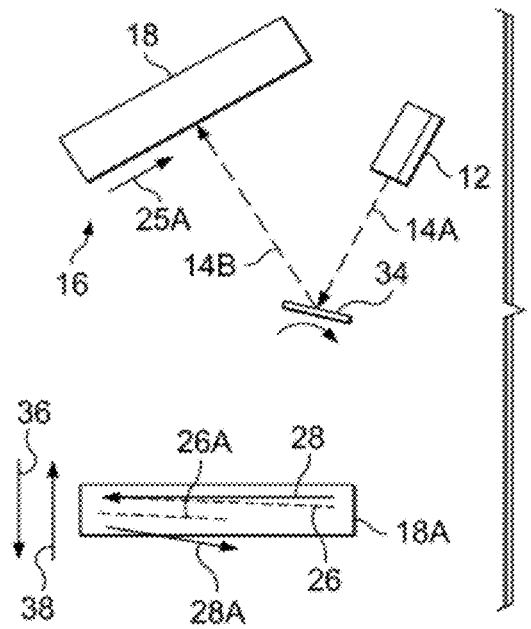

As the oscillating mirror 34 starts pivoting back in the opposite direction as shown by reference number 25A in FIG. 2C, the angled trajectory of the beam 14B illustrated by image plane line 26A and movement of the medium 16 may result in a image line 28A which is at an angle sloping in the opposite direction as the forward sweep. This, of course, is caused by the fact that as the beam sweep returns, the image points on the drum will be moving in a downward direction as indicated by arrow 36, whereas the photosensitive drum movement is in the upward direction indicated by arrow 38. Thus, as stated above, the movement of the drum and the beam trajectory are cumulative.

Figure 2D:
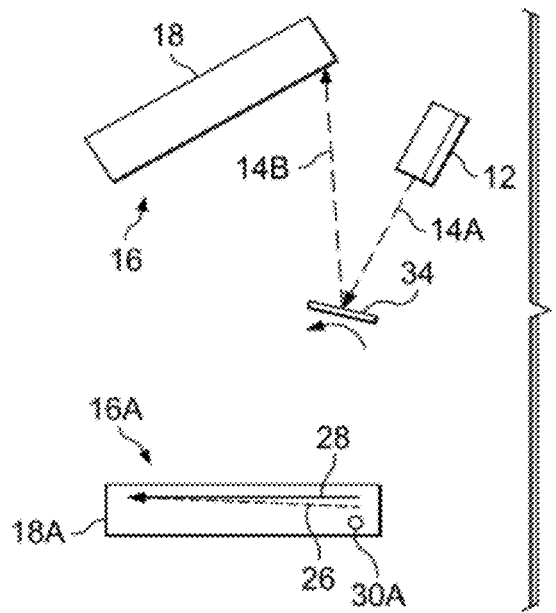

Referring to FIG. 2D, rotating mirror 34 may complete its right scan and then start its left scan again as indicated at 30A, at which time the modulated laser is turned on and a second image line is printed. The return sweep will traverse a trajectory on the moving photosensitive drum which will be at a small angle with the first printed image line resulting from the previous sweep. Consequently, if such a single reflecting surface resonant mirror is to be used, a zigzag effect may be observed. The difference in the angle of the imaged line for the forward and reverse scans is referred to as the zigzag effect.

Thus, it will be appreciated that although the oscillating flat mirror 34 may have the following advantages compared to rotating polygons: less expensive, lower power, lower voltage, smaller footprint, faster spin-up time and low audible signature; a compromise in quality may be necessitated as zigzag effects which are observable under magnification may be produced.

Figure 3:
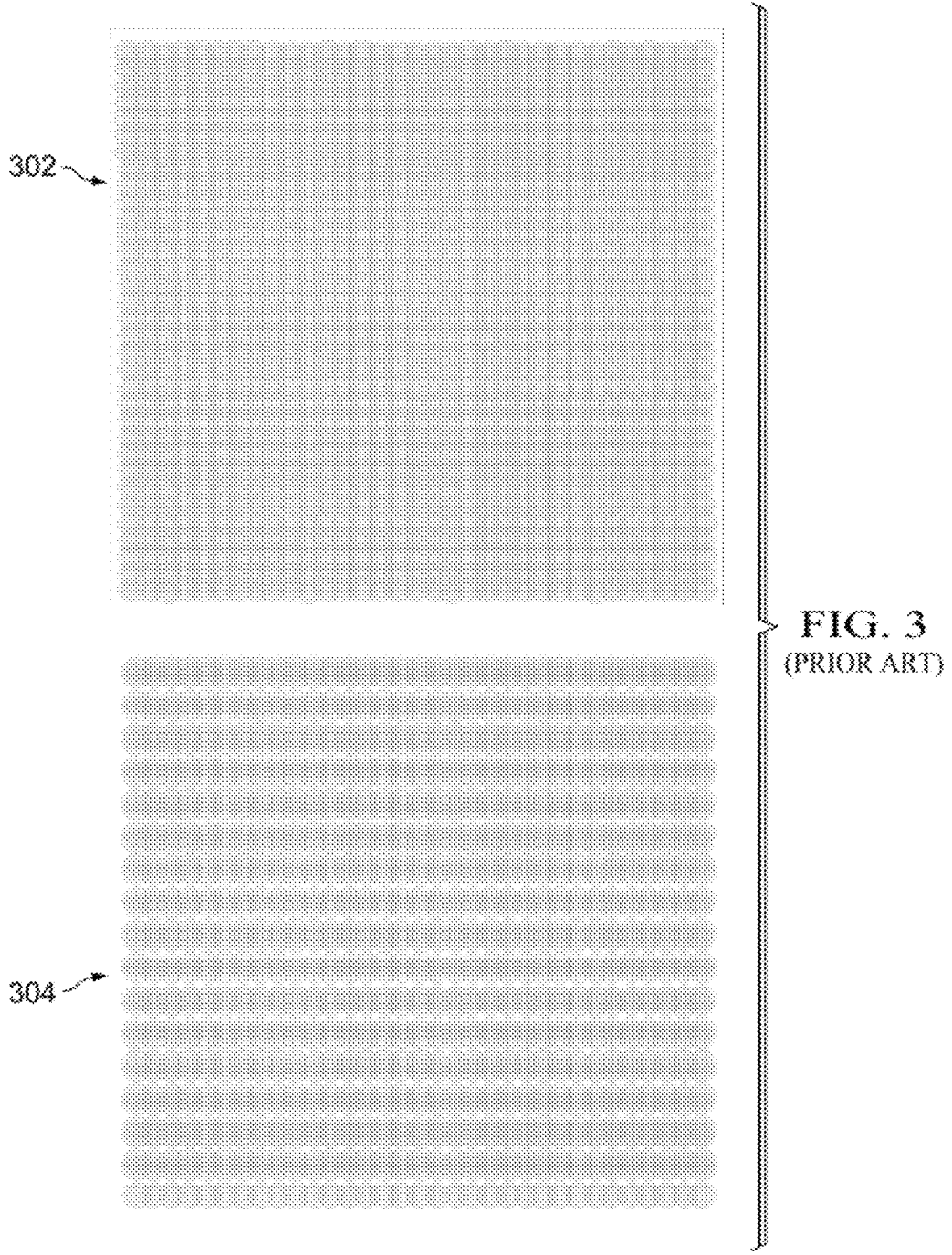
FIG. 3 illustrates an enlarged example of a prior art zigzag issue.

Turning to FIG. 3 an enlarged illustration of the zigzag effect is shown. Field 302 shows an image created simulating the center of a printed page. Field 304 shows a similar image simulating the edge of a printed page. Note the scan lines or zigzag effect seen in field 304 at the edge of the page. This zigzag effect may be noticed on both the left and right sides of a printed page. These images were created with a 50% gray scale whereas the dots created on a laser printer are typically Gaussian in nature. Therefore, aside from the fact that the individual dots are blown up many times the size of the original, the images 302 and 304 show the exaggerated effect of the overlap of the static 50% gray scale.

Figure 4:
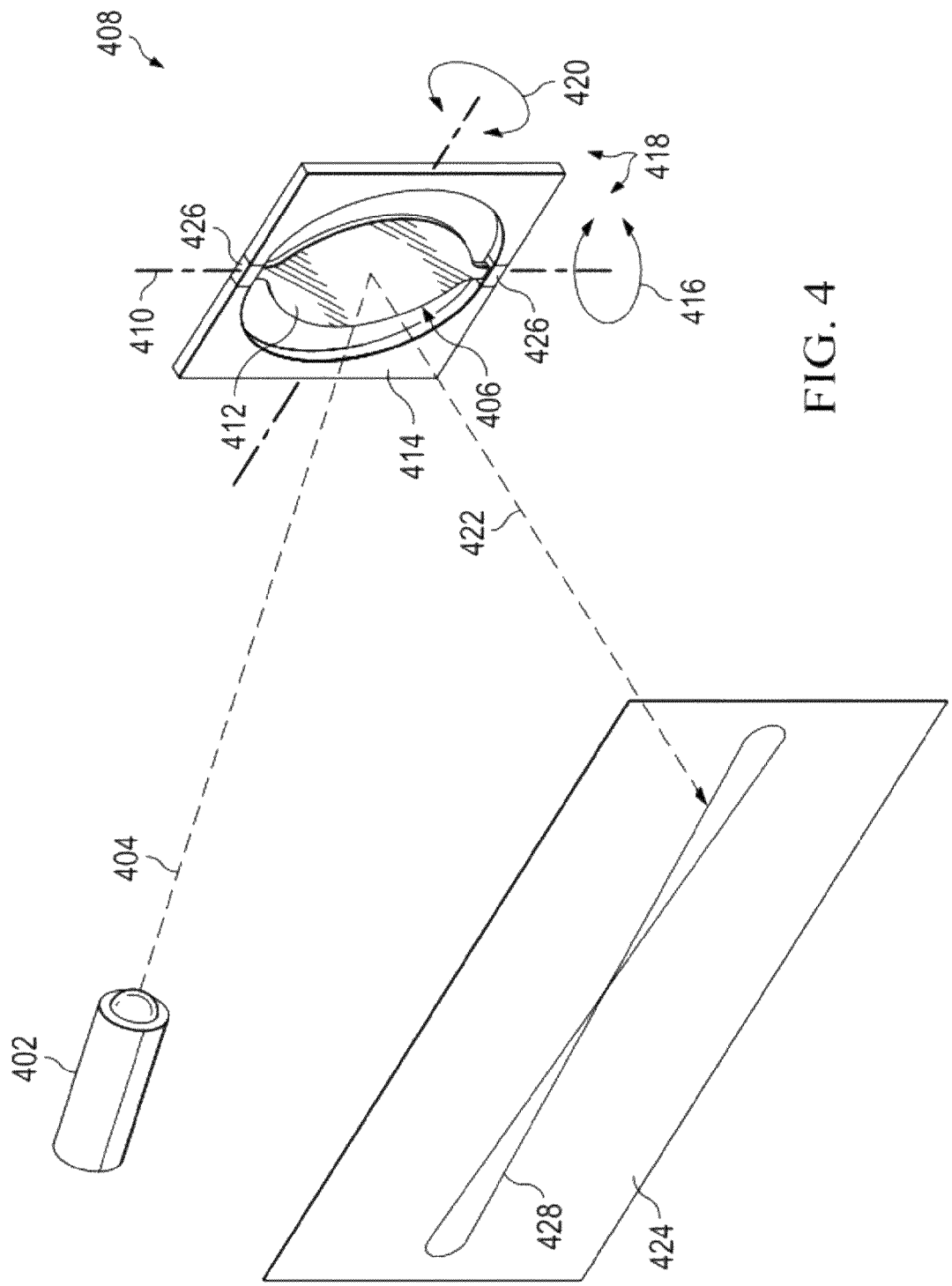
FIG. 4 shows a single piece, single-axis MEMS device according to an illustrative embodiment of the present invention.

Turning to FIG. 4 a single piece, single-axis MEMS device is shown which minimizes or eliminates the zigzag effect by scanning a lemniscate pattern along a fixed image plane. By scanning a lemniscate pattern 428 along a fixed image plane 424, parallel lines may be printed on a moving photosensitive medium (not shown). FIG. 4 shows a single piece, single-axis MEMS device 408 reflecting a beam of modulated light 422 in a lemniscate pattern 428 on a fixed image plane 424, in accordance with an illustrative embodiment. Modulated light source 402 directs a beam of light 404 to a reflective surface 406 of single piece, single-axis MEMS device 408. Modulated light source 402 may be, for example, a laser.

Reflective surface 406 is a portion of mirror 412. Mirror 412 is a movable mirror that rotates (pivots) back and forth about torsional hinge structure 410, producing a raster scan of reflected light 422 on a fixed image plane 424. Thus, torsional hinge structure 410 is the scanning or raster axis for MEMS device 408.

Mirror 412 may be on the order of 110-400 microns in thickness, depending on the operating frequency, and may be suitably polished on its upper surface to provide a reflective surface 406. The thickness of mirror 412 may be determined by the requirement that the mirror remain flat during scanning. Since the dynamic deformation of the mirror is proportional to the square of the operating frequency and proportional to the operating angle, higher frequency, larger angle mirrors require still stiffer mirrors, thus thicker mirrors. In order to provide necessary flatness, mirror 412 may be formed with a radius of curvature greater than approximately 15 meters, depending on the wavelength of light to be reflected. The radius of curvature may be controlled by known stress control techniques such as by polishing on both opposite faces and deposition techniques for stress controlled thin films. If desired, a coating of suitable material can be placed on reflective surface 406 to enhance its reflectivity for specific radiation wavelengths.

Torsional hinge structure (hinges) 410 is the support for mirror 412. Hinges 410 may be anchored by hinge anchors 426. While single-axis MEMS device 408 is shown with frame 414, a frame may or may not be used. It may be desirable to eliminate frame 414 and to employ anchor hinges 426 directly to a support structure (not shown). Hinges 410 and mirror 412 may be fabricated out of a single piece of material (such as single crystalline silicon, for example). The hinges 410 may be made of a single silicon crystal with mirror 412 and hinge anchors 426 made of different materials and attached to a single-axis hinge structure. Alternatively, the single-axis hinge structure may be formed from a single piece of substantially planar material and the functional or moving parts may be etched in the planar sheet of material (such as silicon) by techniques similar to those used in semiconductor art.

Arcuate arrow 416 indicates the rotational (pivotal) movement of mirror 412. The rotational movement of mirror 412 is driven by driver system 418. The rotational angle of mirror 412 with respect to frame 414 may oscillate between, for example, about +/−15 to 30 degrees. It is the rotational movement, indicated by arcuate arrow 416, which provides the raster type scan of single-axis MEMS device 408. Thus, hinges 410 may also be termed "scanning axis 410" and rotational movement indicated by arcuate arrow 416 may also be termed "scanning motion 416" herein.

Driver system 418 includes a permanent magnet, and at least one driver coil. Driver system 418 employs electromagnetic forces providing the torque that causes mirror 412 to oscillate.

Because of the advantageous material properties of single crystalline silicon, single-axis MEMS device 408 may have a very sharp torsional resonance. The Q of the torsional resonance typically is in the range of 100 to over 1000. The sharp resonance results in a large mechanical amplification of the scanning motion 416 of mirror 412 at a resonance frequency versus a low frequency. Therefore, according to one illustrative embodiment, it may be advantageous to pivot mirror 412 about the scanning axis 410 at the resonant frequency. Thus, reducing the needed drive power.

Lemniscate pattern 428 is created by forcing an oscillation to the tilt (shown by arcuate arrow 420) of reflective surface 406 during the course of a single raster type scan (shown by arcuate arrow 416). The oscillation of the tilt 420 precisely creates the resultant lemniscate pattern scan 428 on stationary image plane 424. Note that the lemniscate pattern may also be referred to as a bow tie pattern. The precise oscillation of the tilt of reflective surface 406 as required to produce the lemniscate pattern is one of features of the illustrative embodiments presented, and may be customized for individual applications.

Unlike the single axis mirror 34 as shown in FIG. 2, it is not necessary to turn off the laser (light beam 14B) on the return scan to achieve parallel line printing, since a return or left to right scan can be continuously modulated during the return scan so as to produce a printed line of images on the moving photosensitive medium 16. Subsequent printed lines of images, according to the present invention, will be parallel to the previous scans. This is accomplished by the oscillating tilt of mirror 412 around single-axis hinge structure 410 as was discussed above.

Turning now to FIGS. 5A and 5B an exaggerated schematic of the laser beam trajectory responsive to mirror movement about the axis during one complete resonant cycle in accordance with the illustrative embodiments is shown. FIG. 5A depicts a moving image plane 508, moving in the direction depicted by arrow 586. FIG. 5B depicts a stationary image plane 506, such as the stationary image plane depicted in FIG. 4. It is instructive to compare the images between the moving image plane 508 in FIG. 5A, and the stationary image plane 506 in FIG. 5B. Turning first to FIG. 5B a schematic of the laser beam trajectory shown as image 504 on a stationary image plane 506 responsive to mirror movement about a torsional hinge structure during one complete resonant cycle. A lemniscate pattern is formed. FIG. 5A shows the printed image 502 produced on the moving image plane 508 from the same laser beam trajectory as shown in FIG. 5B. On moving image plane 508, the same laser beam trajectory as shown in FIG. 5B produces parallel lines 594 and 584, which are orthogonal to the direction of the movement of the plane (arrow 586).

In the example shown in FIG. 5A, a right to left movement portion of the beam trajectory as shown on stationary image plane 506 is identified by the reference number 570. It should be understood that the term "beam trajectory" as used herein does not necessarily mean that the laser light is on or actually providing light. The term is used herein to illustrate the path that would be traced if the light was actually on and a beam of light emitted as projected on a stationary image plane, such as stationary image plane 506. As will be appreciated by those skilled in the art, the laser light is typically turned on and off continuously due to modulation and is typically switched off at the two ends (left and right) of a scan or sweep. However, the modulation pattern can vary from full on for the complete scan or sweep to full off for the complete scan. Modulation of the scanning beam, and switching off at the end portion of a scan is also, of course, true for all types of laser printers including polygon based laser printers. Therefore, in the embodiment shown in FIG. 5A, the laser beam is capable of providing modulated light at point 572 that is next to right edge 574 of image plane 506.

However, a printed page usually includes left and right margins. Therefore, although a printed image line could begin at point 572 on a right to left scan of the beam trajectory as shown by trajectory portion 570 on fixed image plane 506, the modulated light beam does not actually start to produce an image until point 576 or margin 578 of the right to left portion of the trajectory and stops printing at the left margin 580. This is also indicated at the rightmost dot 582 on the moving plane image 502 on line 584 in FIG. 5A. Note that the moving plane 508 is moving in a direction as indicated by arrow 586. Therefore, to generate printed image line 584 between margins 578 and 580 as a horizontal line, the right to left beam trajectory is produced by a mirror, such as mirror 412 in FIG. 4, rotating about torsional hinge structure 410 (see FIG. 4) scanning in a right to left direction with a simultaneous oscillating tilt. Therefore, the modulated light beam creates the right to left image line 570 on a stationary image plane and the same modulated light beam creates the right to left horizontal line 584 on a moving image plane. To accomplish this, the speed 586 of the moving plane 508 must correlate to the inner angle 510 formed between a right scanning lemniscate pattern line, which is trajectory portion 570 and a left scanning lemniscate pattern line, which is trajectory portion 592.

In other words, the image of the beam trajectory is moved up (by tilting the mirror) during a beam sweep by substantially the same amount or distance as moving plane 508 moves up during the right to left beam sweep. After the right to left portion 570 of the beam trajectory is complete at the left edge 580 (point 582), half of the resonant or oscillating cycle is complete. The mirror is rotated (pivoted) about single-axis torsional hinges in the opposite direction as the resonant mirror changes the direction of its sweep as indicated by portion 592 of the beam trajectory. Then, when the left to right portion 592 of the trajectory beam sweep (resulting from the mirror structure pivoting about the single-axis hinge structure) reaches the left edge 580, the mirror continues the oscillating tilt about the torsional hinges to shift the left to right portion 592 of the beam trajectory upward as it traverses across the image plane in a manner similar to the right to left portion of the trajectory. The reflective surface of the mirror is simultaneously tilted in the opposite direction to cause portion 592 of the image formed on stationary image plane 506. Therefore, the modulated light beam creates the left to right image line 592 on a stationary image plane and the same modulated light beam creates the left to right horizontal line 594 on a moving image plane.

Thus, the generated image line 594 starting at beginning point 596 and generated during the left to right scan is maintained parallel to the previous generated image line 584. Then as the beam trajectory passes the right edge 578 of image 504, the resonant scan mirror again begins to reverse its direction by pivoting in the opposite direction about the torsional hinges so as to return to the starting point 572. The cycle is then of course repeated for another complete resonant sweep such that two more image lines are produced. As discussed above, the rotating action of the mirror about single-axis hinge structure produces the right to left and left to right scanning. However, to achieve a lemniscate pattern on a stationary image plane the mirror rotation must be further influenced, for example by additional torque while the mirror structure is rotating. Note however, that the torsional hinge structure is fixed with anchor hinges, such as anchor hinges 426 in FIG. 4 and therefore the torsional hinge structure is constrained. A single crystalline silicon structure, such as one embodiment of the mirror/torsional hinge structure, may strain under additional influences allowing the mirror to pivot slightly out of plane, for example in a range of much less than +/−1 degree, such as +/−0.01 degree. The method of producing the influence that causes this constrained precession about the single-axis hinge structure is further discussed in the figures below.

Turning to FIGS. 6A-6C, three views of a bi-directional single-axis hinge structure MEMS are illustrated. FIG. 6A shows a view of the single-axis hinge MEMS device oriented with a normal 613 of mirror 615 pointing down. Core 618 is shown with coil 658 indicated. Core tips 620 are shown in a plane over the mirror 615 and torsional hinge structure 614. The electric coil 658 is used to provide an electromagnetic drive for the beam sweep. Thus by energizing the coil with alternating positive and negative voltage at a selected frequency, the mirror 615 can be made to oscillate at that frequency. To facilitate the electromagnetic drive, mirror assembly 604 may also include a permanent magnet 612. It should be obvious to one skilled in the art that there are many combinations of drive mechanisms for the scan axis and for the substantially orthogonal or cross scan axis. The mirror mechanical motion in the scan axis is typically greater than 15 degrees and may be as great as 30 degrees, for example, whereas movement about the cross scan axis may be less than 1 degree. Since pivoting about the scan axis must move through a large angle and the mirror is long in that direction, electromagnetic or inertial drive methods for producing movement about the scan axis have been found to be effective. Inertial drive involves applying a small rotational motion at or near the resonant frequency of the mirror to the whole silicon structure, which then excites the mirror to resonantly pivot or oscillate about its torsional axis. In this type of drive, a very small motion of the whole silicon structure can excite a very large rotational motion of the mirror.

FIG. 6B provides a closer view of FIG. 6A, with the mirror assembly 604 oriented in the same direction as FIG. 6A. Mirror 615 may be seen with torsional hinge structure 614. Permanent magnet 612 may be mounted on torsional hinge structure 614. Permanent magnet 612 may, in an embodiment, symmetrically distribute mass about the axis of rotation of torsional hinge structure 614 to thereby minimize oscillation under shock and vibration, and in another embodiment provide the tilting influence, which drives the oscillating tilt of mirror 615. Permanent magnet 612 may be mounted to torsional hinge structure 614 using conventional attachment techniques such as adhesive or indium bonding. The magnetic vector of permanent magnet 612 may be oriented depending upon magnetic characteristics desired. Core tips 620 may be seen over permanent magnet 612.

FIG. 6C shows a closer view of mirror assembly 604 oriented so that a normal of mirror 615 is pointing out of the page. Mirror 615 may be any shape, for example, a round mirror or reflective surface, or a long oval mirror or reflective surface or the like. Thus, it will be appreciated that if the mirror 615 can be maintained in a resonant state by a drive source, mirror 615 may be used to cause a rotating (pivoting) light beam to move repeatedly across a photosensitive medium. It will also be appreciated that an alternate embodiment of a single axis MEMS device may comprise a support member or frame, such as frame 414 in FIG. 4. Otherwise, torsional hinges 610 may simply extend to a pair of hinge anchors such as hinge anchors 626 partially shown in FIG. 6C. Mirror 615 shown in close up in FIG. 6C is viewed through an opening in the mirror assembly 604; therefore, not all of hinge anchors 626 may be seen. Probe tips 620 are shown as vertical lines below the plane of torsional hinge structure 610.

Other drive circuits for causing pivoting of the mirror around single-axis hinge structures may be employed. These drive sources include piezoelectric drives and electrostatic drive circuits. Piezoelectric and electrostatic drive circuits have been found to be especially suitable for generating the resonant oscillation for producing the back and forth beam sweep.

Further, by carefully controlling the dimension of hinges 610A and 610B (i.e., width, length and thickness) the mirror may be manufactured to have a natural resonant frequency which is substantially the same as the desired oscillating frequency of the mirror. Thus, by providing a mirror with a resonant frequency substantially equal to the desired oscillating frequency, the power loading may be reduced.

As discussed in the figures above, a slight but precise oscillating tilt about the single-axis of the single-axis hinge structure is produced to form the lemniscate pattern of the stationary image plane as shown in FIG. 5. Methods for producing the tilting influence to the mirror/torsional hinge structure/hinge anchor/core driver system (mirror structure) to produce the oscillating tilt are discussed in the figures following. Any tilting influence on the rotating single-axis mirror structure that produces the precise oscillating tilt for the lemniscate pattern is within the scope of the illustrative embodiments. However, a few of the illustrative embodiments will be discussed as examples in the figures below.

Figure 7A:
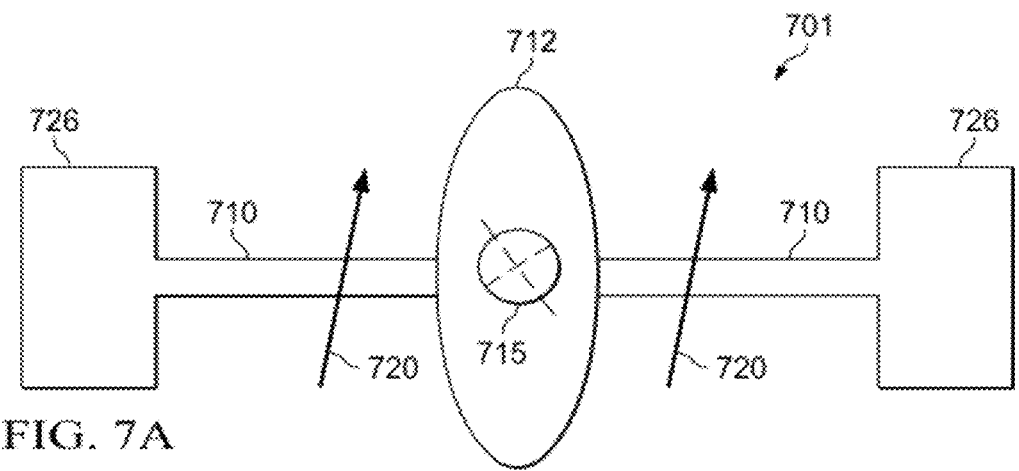
FIGS. 7A-7C show aspects of an illustrative embodiment, which includes an asymmetric magnetic field driver.
Figure 7B:
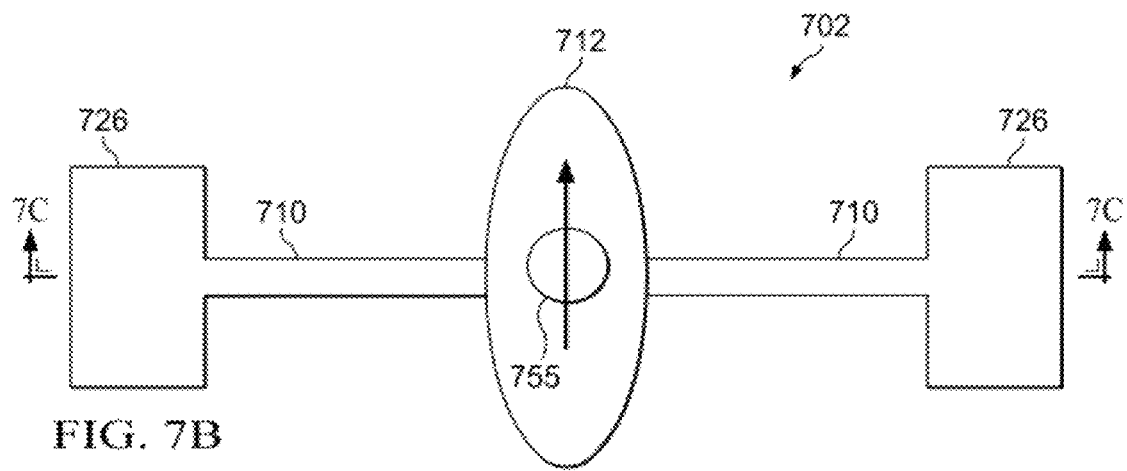
Figure 7C:
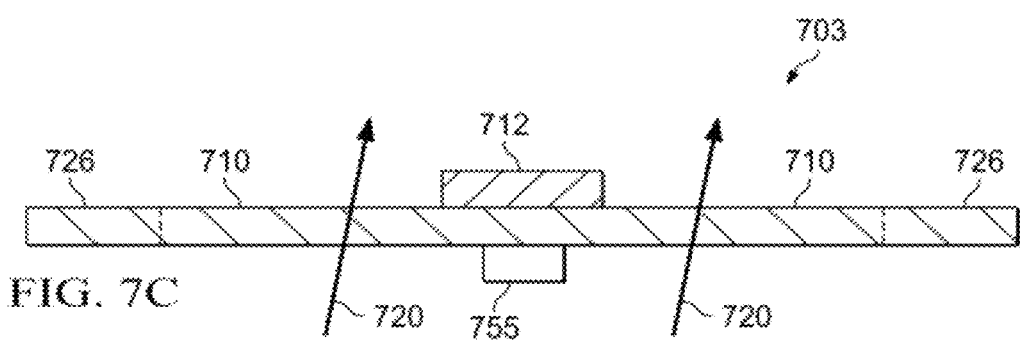

FIGS. 7A-7C show aspects of an illustrative embodiment, which includes an asymmetric magnetic field driver. Turning to FIG. 7A, for example, one embodiment includes producing an asymmetric component in the torque applied to the rotating structure by changing the symmetry of the applied alternating magnetic field. In FIG. 7A, an axially charged magnet 715 is attached to torsional hinge structure 710 in a plane beneath mirror 712. The magnetic vector of axially charged magnet 715 is normal to the surface of mirror 712. Tilting the direction of the applied magnetic field several degrees from vertical produces a torque component that drives the out of plane motion of mirror 712. In other words, the asymmetric magnetic field driver is the influence that causes the oscillating tilt. The change in applied field direction is accomplished by changing the geometry of the driving core or coil. Alternatively, the mirror 712/torsional hinge structure 710/magnet 715 may be mounted at an angle to the driving core or coil. The magnetic vectors produced by the driving core or coil are shown by arrows 720.

Turning to FIG. 7B, another illustrative embodiment of an asymmetric drive magnetic field is shown for a diametrally charged magnet. Diametrally charged magnet 755 is attached to torsional hinge structure 710 in a plane beneath mirror 712. The magnetic vector of diametrally charged magnet 755 is parallel to the plane of the single axis hinge structure 702 and normal to the torsional hinges structure 710. The magnetic field is applied symmetrically in and out of the plane of the image. As shown in the cross section of FIG. 7C, the magnet is mounted so that the magnetic vector of the magnet is tilted relative to the hinge by several degrees, which produces a torque component that drives out of plane motion. Thus, the asymmetric drive magnetic field is the influence that causes the oscillating tilt. The tilt in applied field direction is accomplished by changing the geometry of the driving core or coil.

Figure 8A:
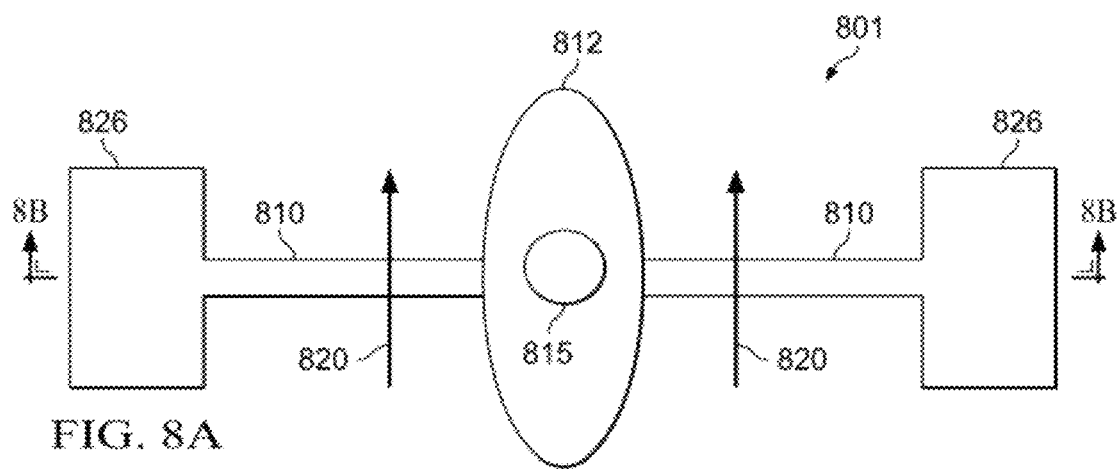
FIGS. 8A-8C show aspects of an illustrative embodiment, which includes a permanent magnet forming an asymmetric magnetic field relative to the mirror/single-axis hinge structure.
Figure 8B:
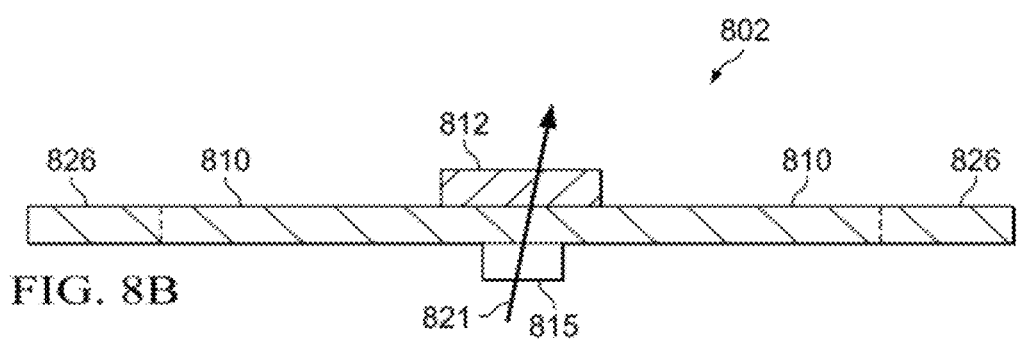
Figure 8C:
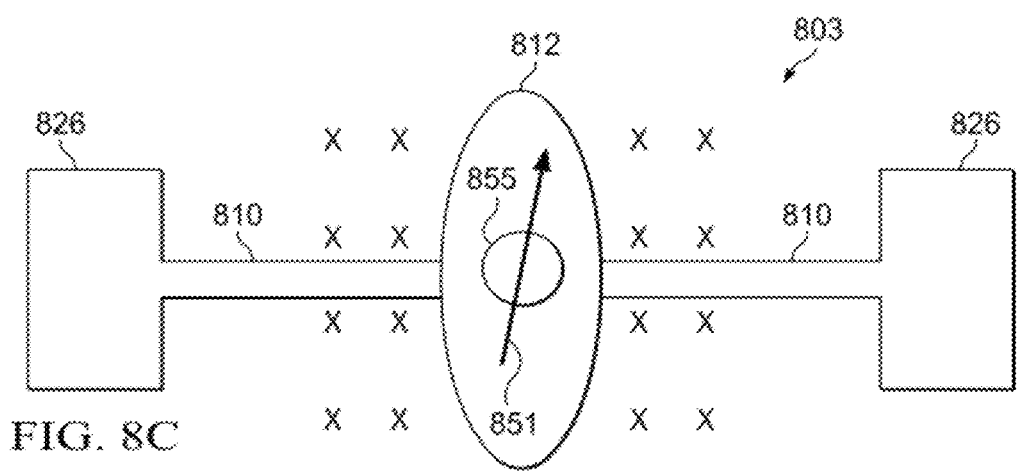

FIGS. 8A-8C show aspects of an illustrative embodiment, which includes a permanent magnet forming an asymmetric magnetic field relative to the mirror/torsional hinge structure. In this example, an illustrative embodiment is presented in which an asymmetric component in the torque applied to the torsional hinge structure is accomplished by changing the geometry of the magnet attached to the torsional hinge structure. In FIG. 8A, an axially charged magnet 815 is attached to torsional hinge structure 810 in a plane beneath torsional hinge structure 810. Tilting the magnetic vector of axially charged magnet 815 several degrees off the normal of the surface of mirror 812 produces a torque component that drives the out of plane motion. Thus, the permanent magnet forming an asymmetric magnetic field relative to the single-axis hinge structure is the influence that causes the oscillating tilt of mirror 812. The change in magnetic vector of magnet 815 may be accomplished by charging the magnet at a tilt by mounting magnet 815 at a tilt with respect to the torsional hinge structure 810. The tilted magnetic vector 821 is shown more clearly in FIG. 8B, a cross sectional drawing of FIG. 8A.

Turning to FIG. 8C, another illustrative embodiment of an asymmetric magnetic field is shown for a diametrally charged magnet. Diametrally charged magnet 855 is attached to torsional hinge structure 810 in a plane beneath the torsional hinge structure 810. The magnetic field is applied symmetrically in and out of the plane of the image. The magnet is mounted so that the magnetic vector of the magnet is tilted relative to the hinge by several degrees, which produces a torque component that drives out of plane motion. In other words, the tilted magnetic vector of the magnet is the influence that causes the oscillating tilt.

Figure 9:
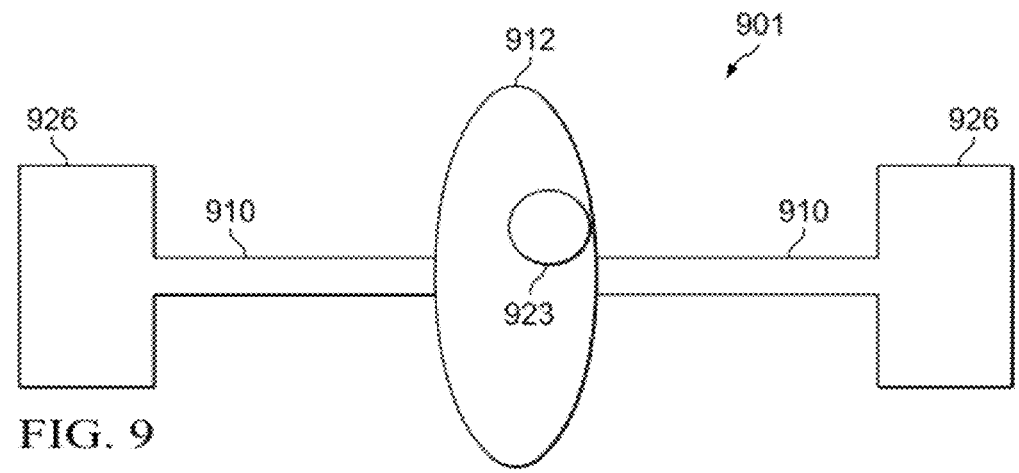
FIG. 9 shows an aspect of an illustrative embodiment which includes a mirror with an asymmetric center of mass.

FIG. 9 shows an aspect of an illustrative embodiment, which includes a mirror with an asymmetric center of mass. The asymmetric center of mass 923 may be created by mounting a magnet asymmetrically on torsional hinge structure 910 or by a mirror 912 with material distributed asymmetrically for example. As the mirror rotates in the scanning direction, the asymmetrical center of mass produces a motion where the normal to the mirror moves out of plane, in other words, the asymmetric center of mass 923 is the tilting influence that provides the oscillating tilt of mirror 912.

Figure 10A:
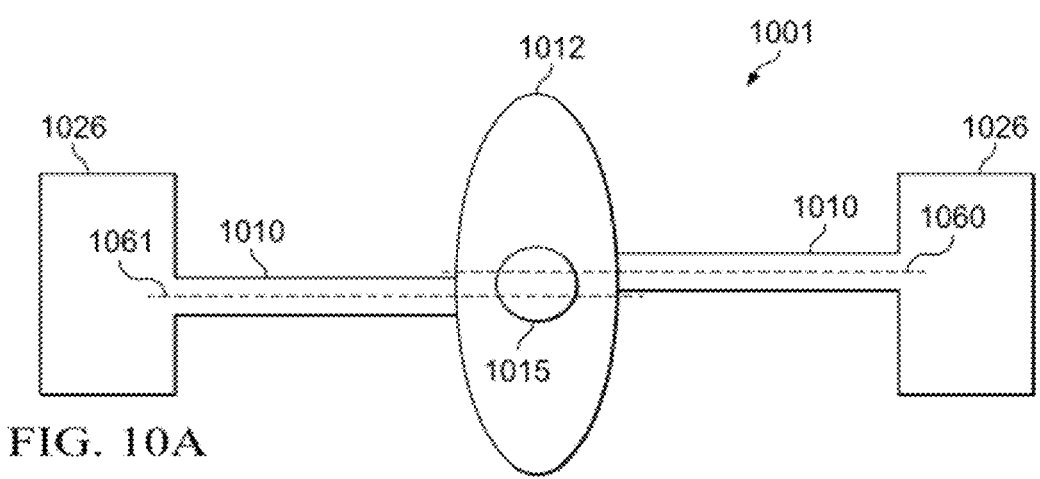
FIGS. 10A and 10B show aspects of an illustrative embodiment which includes a torsional hinge structure with an asymmetrical stiffness matrix.
Figure 10B:
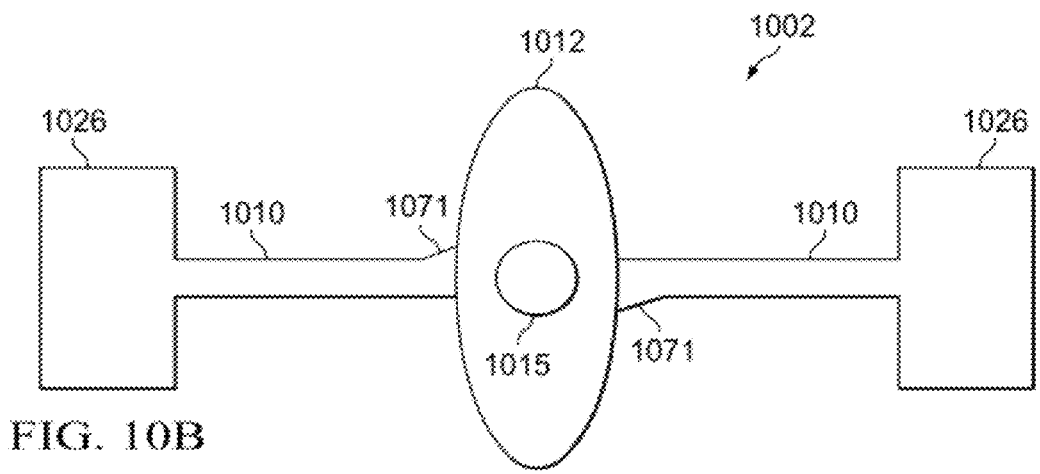

FIGS. 10A and 10B show aspects of an illustrative embodiment, which includes a single-axis hinge structure with an asymmetrical stiffness matrix. FIG. 10A shows a first embodiment of producing an asymmetric stiffness matrix by changing the hinge geometry. Torsional hinge structure 1010 has a centerline 1061 on the right side of mirror 1012 and a different centerline 1060 on the right side of mirror 1012. The centerlines 1061 and 1060 are parallel and offset in the plane of torsional hinge structure 1010. Arranging the hinge geometry as shown will produce an asymmetric stiffness matrix and produce a motion where the normal to the mirror moves out of plane, providing the tilting influence that provides the oscillating tilt of mirror 1010. FIG. 10B depicts another way to produce an asymmetric stiffness matrix. In FIG. 10B, the centerline of the right side and the left side of torsional hinge structure 1010 are the same, but additional material exists at diagonals of the hinge roots 1071 at the intersection of the mirror 1012 and the torsional hinge structure 1010. Hinge roots 1071 may be wider and have edges that are more curved than long straight hinge areas of the single-axis hinge structure in order to withstand the additional stress placed on the hinge roots 1071. These two embodiments show two of many possible hinge geometries that will produce an asymmetric stress matrix.

Figure 11A:
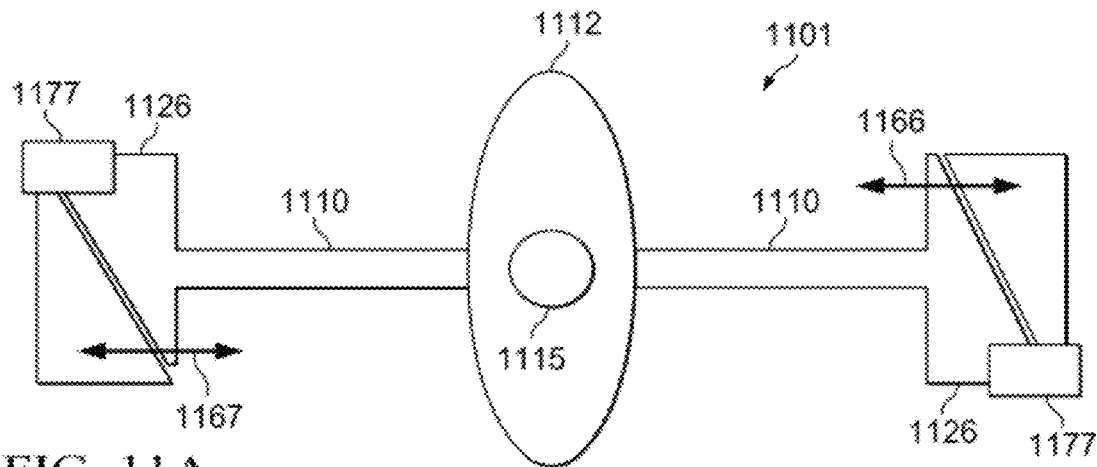
FIGS. 11A-11C show aspects of an illustrative embodiment, which includes asymmetric hinge anchors.
Figure 11B:
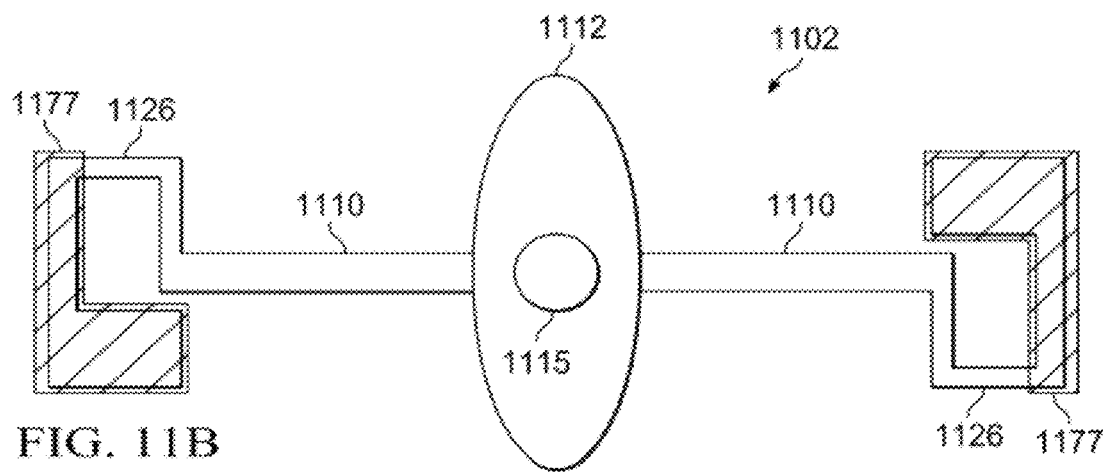
Figure 11C:
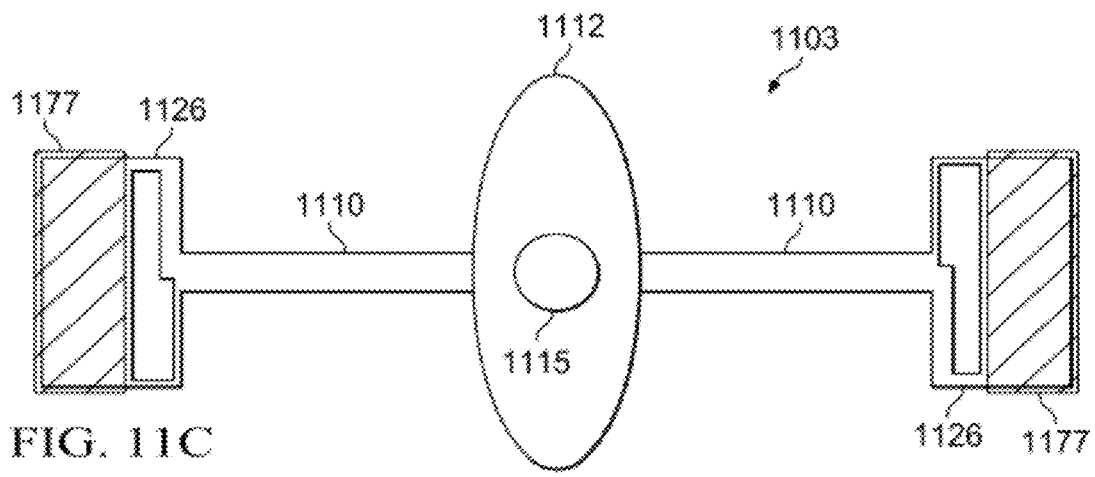

FIGS. 11A-11C show aspects of an illustrative embodiment, which includes asymmetric hinge anchors. FIG. 11 shows three views of many possible hinge anchor configurations. FIG. 11A shows triangular shaped hinge anchors 1126 with hinge anchor adhesion areas or mount points 1177 asymmetrically attached. Arranging the hinge anchor 1126 geometry and mount points 1177 as shown will produce a flexing of the torsional hinge structure 1110 so that the free ends of the anchors will move as shown by arrows 1166 and 1167.

FIGS. 11B and 11C show other ways of arranging the anchor geometry and mount points, which will produce a flexing of the torsional hinge structure. The flexing is a motion where the normal to the mirror moves out of plane and provides the oscillating tilt.

Although the illustrative embodiment and its advantages have been described in detail, it should be understood that various changes, substitutions, and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that geometries may be varied while remaining within the scope of the present invention.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A printer comprising:
a light source providing a modulated beam of light;
a first device including:
- a mirror with a reflective surface positioned to intercept the modulated beam of light;
- a single-axis hinge structure for rotating the mirror such that the resultant reflected beam is swept in a scan plane and creates an image at an intersection of the scan plane and an image plane, wherein the single-axis hinge structure includes an asymmetrical stiffness matrix;
- a first driver system that causes the mirror to rotate about the single-axis hinge structure and to oscillate at a tilt about the single-axis hinge structure, wherein the resultant reflected beam of light forms a lemniscate pattern along the image plane, wherein the lemniscate pattern has an inner angle between a left sweep segment and a right sweep segment of the image;

a second device including:
- a photosensitive medium with a first dimension substantially along the intersection of the scan plane and image plane, the photosensitive medium located to receive the image of the reflected beam of light as the reflected beam of light is swept along the intersection; and
- a second device driver that causes the photosensitive medium to move in a second dimension substantially orthogonal to the first dimension, wherein the inner angle of the lemniscate pattern formed on the image plane is coordinated to the motion of the photosensitive medium such that the image is formed on the photosensitive medium along lines substantially parallel to each other and orthogonal to the movement of the photosensitive medium, wherein the single-axis hinge structure comprises:
a first centerline extending the length of the first side of the single-axis hinge structure; and
a second centerline extending the length of the second side of the single-axis hinge structure, wherein the first centerline and the second centerline are parallel and offset from each other in the plane of the single-axis hinge structure.

2. The printer of claim 1, wherein the first device is a MEMS device.

3. The printer of claim 1, wherein the photosensitive medium moves at a constant speed in the second dimension.

4. The printer of claim 1, further comprising a rotary drum wherein the rotary drum causes the photosensitive medium to rotate.

5. A printer comprising:
a light source providing a modulated beam of light;
a first device including:
- a mirror with a reflective surface positioned to intercept the modulated beam of light;
- a single-axis hinge structure for rotating the mirror such that the resultant reflected beam is swept in a scan plane and creates an image at an intersection of the scan plane and an image plane, wherein the single-axis hinge structure includes an asymmetrical stiffness matrix;
- a first driver system that causes the mirror to rotate about the single-axis hinge structure and to oscillate at a tilt about the single-axis hinge structure, wherein the resultant reflected beam of light forms a lemniscate pattern along the image plane, wherein the lemniscate pattern has an inner angle between a left sweep segment and a right sweep segment of the image;

a second device including:
- a photosensitive medium with a first dimension substantially along the intersection of the scan plane and image plane, the photosensitive medium located to receive the image of the reflected beam of light as the reflected beam of light is swept along the intersection; and
- a second device driver that causes the photosensitive medium to move in a second dimension substantially orthogonal to the first dimension, wherein the inner angle of the lemniscate pattern formed on the image plane is coordinated to the motion of the photosensitive medium such that the image is formed on the photosensitive medium along lines substantially parallel to each other and orthogonal to the movement of the photosensitive medium, wherein the asymmetrical stiffness matrix comprises:
a first additional material added to a single-axis hinge structure root at a first intersection region with the mirror and the single-axis hinge structure on a first side of the mirror; and
a second additional material added to a single-axis hinge structure root at a second intersection region with the mirror and the single-axis hinge structure on a second side of the mirror, wherein the first additional material is added to a location diagonally across the center of a plane of the mirror from the second additional material.

6. A printer comprising:
a light source providing a modulated beam of light;
a first device including:
- a mirror with a reflective surface positioned to intercept the modulated beam of light;
- a single-axis hinge structure for rotating the mirror such that the resultant reflected beam is swept in a scan plane and creates an image at an intersection of the scan plane and an image plane, wherein the single-axis hinge structure employs non-symmetrical hinge anchors;
- a first driver system that causes the mirror to rotate about the single-axis hinge structure and to oscillate at a tilt about the single-axis hinge structure, wherein the resultant reflected beam of light forms a lemniscate pattern along the image plane, wherein the lemniscate pattern has an inner angle between a left sweep segment and a right sweep segment of the image;

a second device including:
- a photosensitive medium with a first dimension substantially along the intersection of the scan plane and image plane, the photosensitive medium located to receive the image of the reflected beam of light as the reflected beam of light is swept along the intersection; and
- a second device driver that causes the photosensitive medium to move in a second dimension substantially orthogonal to the first dimension, wherein the inner angle of the lemniscate pattern formed on the image plane is coordinated to the motion of the photosensitive medium such that the image is formed on the photosensitive medium along lines substantially parallel to each other and orthogonal to the movement of the photosensitive medium, wherein the single-axis hinge structure comprises hinge anchors adhered asymmetrically.

7. The printer of claim 6, wherein the first device is a MEMS device.

8. The printer of claim 6, wherein the photosensitive medium moves at a constant speed in the second dimension.

9. The printer of claim 6, further comprising a rotary drum wherein the rotary drum causes the photosensitive medium to rotate.

* * * * *